United States Patent
Schuster

(10) Patent No.: US 10,001,024 B2
(45) Date of Patent: Jun. 19, 2018

(54) ABRADABLE COMPOSITION AND SEAL OF AN AXIAL-FLOW TURBOMACHINE COMPRESSOR CASING

(71) Applicant: Techspace Aero S.A., Herstal (Milmort) (BE)

(72) Inventor: Laurent Schuster, Erezee (BE)

(73) Assignee: Safran Aero Boosters SA (BE)

( * ) Notice: Subject to any disclaimer, the term of this patent is extended or adjusted under 35 U.S.C. 154(b) by 295 days.

(21) Appl. No.: 14/818,360

(22) Filed: Aug. 5, 2015

(65) Prior Publication Data
US 2016/0146034 A1 May 26, 2016

(30) Foreign Application Priority Data
Nov. 24, 2014 (EP) .................................... 14194526

(51) Int. Cl.
*F01D 11/12* (2006.01)
*F01D 11/00* (2006.01)
(Continued)

(52) U.S. Cl.
CPC .............. *F01D 11/122* (2013.01); *C23C 4/04* (2013.01); *C23C 4/06* (2013.01); *C23C 4/134* (2016.01);
(Continued)

(58) Field of Classification Search
CPC .... F01D 11/122; F01D 11/125; F01D 11/001; F01D 9/04
See application file for complete search history.

(56) References Cited

U.S. PATENT DOCUMENTS 6,435,824 B1 * 8/2002 Schell ..................... C04B 38/00
415/174.4
7,160,352 B2 * 1/2007 Le Biez .............. C22C 32/0094
428/324
(Continued)

FOREIGN PATENT DOCUMENTS

| EP | 1010861 A2 | 6/2000 |
| EP | 1428600 A1 | 6/2004 |
| EP | 2418387 A1 | 2/2012 |

OTHER PUBLICATIONS

European Search Report from corresponding European Application No. EP14194526.1, dated May 28, 2015.

*Primary Examiner* — Igor Kershteyn
*Assistant Examiner* — Eric Zamora Alvarez
(74) *Attorney, Agent, or Firm* — Sandberg Phoenix & von Gontard P.C.

(57) ABSTRACT

The invention relates to a composition for an abradable seal of a turbomachine, the composition comprising an aluminum base, nickel powder, polyester powder. The invention also relates to an outer casing of a low-pressure compressor of an axial-flow turbomachine with an abradable seal surrounding an annular row of rotor blades. The seal comprises a rounded support covered with a layer of abradable material comprising a metallic phase mainly made of aluminum and with nickel in a lesser proportion. The abradable material additionally comprises from 25% to 55% of additive, such as polyester, methyl methacrylate, hexagonal boron nitride, calcium fluoride. The support is segmented, and forms an organic matrix composite outer casing of the compressor. The invention also proposes a process for producing an abradable seal by plasma spraying an Al—Ni-polyester powder.

19 Claims, 2 Drawing Sheets

(51) Int. Cl.
*F01D 9/04* (2006.01)
*F04D 29/32* (2006.01)
*C23C 4/06* (2016.01)
*C23C 4/134* (2016.01)
*C23C 4/04* (2006.01)

(52) U.S. Cl.
CPC .............. *F01D 9/04* (2013.01); *F01D 11/001* (2013.01); *F01D 11/125* (2013.01); *F04D 29/321* (2013.01); *F05D 2220/32* (2013.01); *F05D 2230/312* (2013.01); *F05D 2240/55* (2013.01); *F05D 2300/121* (2013.01); *F05D 2300/16* (2013.01); *F05D 2300/43* (2013.01); *F05D 2300/6032* (2013.01); *Y02T 50/672* (2013.01)

(56) References Cited

U.S. PATENT DOCUMENTS

| | | | |
|---|---|---|---|
| 7,892,652 B2 * | 2/2011 | Strock | C23C 4/04 106/1.05 |
| 2013/0129494 A1 * | 5/2013 | Duchaine | F01D 9/041 415/191 |

* cited by examiner

ABRADABLE COMPOSITION AND SEAL OF AN AXIAL-FLOW TURBOMACHINE COMPRESSOR CASING

CROSS-REFERENCE TO RELATED APPLICATIONS

This application claims the benefit, under 35 U.S.C. § 119, of EP 14194526.1, filed Nov. 24, 2014, the disclosure of which is incorporated herein by reference in its entirety.

FIELD

The invention relates to the field of axial-flow turbomachine seals made of abradable material. More specifically, the invention tackles the subject of seals made of aluminium-based abradable material for an axial-flow turbomachine compressor for aircraft.

BACKGROUND

An abradable material is known for ensuring dynamic sealing in a turbomachine, e.g., in a compressor of the axial-flow turbomachine. Such material is applied as a layer to an outer casing and is capable of eroding in the event of contact with the tips of rotor blades without damaging them. The mechanical integrity is preserved despite speeds of rotation of greater than 8000 rpm, and a relative speed between a blade tip and its seal substantially equal to the speed of sound. Such a material is also used for ensuring sealing under inner shrouds, or on a drive shaft bearing.

In this way, it is possible to design a compressor while reducing the operating clearance between the tips of rotor blades and the inner surface of the casing. The optimization can also take into account the expansion, the centrifugal force; and certain operating risks such as ingestions and pumping phenomena. An abradable material that forms a casing coating generally comprises aluminium, silica, polyester.

Document EP 1 010 861 A2 discloses a composition of a layer of abradable material for an axial-flow turbomachine compressor. The composition comprises a mixture of aluminium powder and silica powder, the aluminium being in the majority. In addition, the powder has a polymer powder with methyl methacrylate. This composition is applied by plasma spraying onto a wall of an axial-flow turbomachine compressor, the wall receiving beforehand a bonding layer with a majority amount of nickel, and aluminium in a lesser proportion. This composition makes it possible to produce an abradable seal with a requirement of corrosion resistance, however this corrosion resistance still warrants being improved in order to optimize the resistance and the efficiency of the turbomachine.

SUMMARY

The objective of the invention is to solve at least one of the problems posed by the prior art. More specifically, one objective of the invention is to improve the corrosion resistance of an axial-flow turbomachine seal made of abradable material. Another objective of the invention is to optimize both the durability of the abradable material, the friable nature of the abradable material and the sealing provided by the abradable material.

In various embodiments, the present disclosure discloses a seal for an axial-flow turbomachine, e.g., for a compressor, e.g., a low-pressure compressor, of an axial-flow turbomachine. In various embodiments, the seal comprises a rounded support, at least one coating made of abradable material with a metallic phase mainly or predominantly comprising aluminium, e.g., aluminium powder, the metallic phase additionally comprises nickel, e.g., a nickel powder, the abradable coating being applied to the rounded support, and being structured and operable to cooperate by abrasion with a rotor element of the axial-flow turbomachine.

Another subject of the invention is a composition for an abradable coating of a seal of an axial-flow turbomachine, e.g., for application to a rounded support by plasma spraying, the composition comprising metal, e.g., a metallic powder, with mainly aluminium, an organic or mineral filler, such as powder, in various embodiments the metal additionally comprises nickel, e.g., nickel powder.

According to various embodiments of the invention, the metal comprises, by weight, between 20% and 45%, e.g., between 35% and 45% of nickel, e.g., of nickel powder.

According to various embodiments of the invention, the metal comprises, by weight, between 55% and 80% of aluminium, e.g., of aluminium powder.

According to various embodiments of the invention, the composition comprises, by weight, between 5% and 50% of filler, e.g., between 15% and 25% of filler. In various embodiments, the filler is a polymer such as polyester or methyl methacrylate, or hexagonal boron nitride, or calcium fluoride, e.g., as powder(s).

According to various embodiments of the invention, the combination of aluminium and nickel represents more than 80% of the weight of the metal of the composition, for example, more than 90%, e.g., more than 95%.

Another subject of the invention is a seal of an axial-flow turbomachine, e.g., of a compressor of an axial-flow turbomachine, wherein the seal comprises a rounded support, at least one coating made of abradable material covering the rounded support, and which is intended to cooperate by abrasion with a rotor element of the axial-flow turbomachine. In various embodiments the composition of the abradable coating is in accordance with the invention, as described herein.

According to various embodiments of the invention, in the abradable coating, the metal forms a matrix which is combined with the filler. In various embodiments in the abradable coating, the volume occupied by the metallic matrix is the majority volume.

According to various embodiments of the invention, the rounded support is an outer shroud, the abradable coating being on the inside of the outer shroud, or alternatively the rounded support is an outer casing, the abradable coating being positioned on the inside of the outer casing.

According to various embodiments of the invention, the support is made of an organic matrix composite material with carbon fibres and/or glass fibres, the fibres being arranged as a stack of optionally woven fibrous plies.

According to various embodiments of the invention, the support comprises attachment means, such as orifices and/or at least one annular attachment tab, the means being positioned upstream and/or downstream of the abradable coating.

According to various embodiments of the invention, the support has an annular groove with an upstream edge and a downstream edge, the abradable coating covering the annular groove from the upstream edge to the downstream edge.

According to various embodiments of the invention, the abradable coating forms a layer having a thickness of greater than 0.30 mm, for example, greater than 2.00 mm, e.g., greater than 5.00 mm.

According to various embodiments of the invention, the coating forms a uniform layer over its thickness and/or over its main area.

According to various embodiments of the invention, the rounded support forms a circle or a portion of a circle. The expression "portion of a circle" can be understood to mean an angular portion of a circle.

According to various embodiments of the invention, the abradable coating has a compactness of greater than 80%, for example, of greater than 95%, e.g., of greater than 99%.

According to various embodiments of the invention, in the metal of the abradable coating, the volume of aluminium is the majority volume.

According to various embodiments of the invention, the abradable coating forms a leak-tight barrier so as to protect the support from chemical attacks of the turbomachine.

According to various embodiments of the invention, the seal comprises an interlayer positioned between the support and the abradable coating, e.g., the interlayer is a metal strip.

Another subject of the invention is a process for producing an abradable seal of an axial-flow turbomachine, e.g., of a compressor of an axial-flow turbomachine, the seal comprising a rounded support and an abradable coating applied to the support, the process comprising the following steps: (a) provision or manufacture of a rounded support; (d) application of an abradable composition to the rounded support, the composition comprising metallic powder that mainly comprises aluminium powder. In various embodiments, during the application step (d), the metallic powder additionally comprises nickel powder. IN various embodiments the composition is in accordance with the invention, as described herein.

According to various embodiments of the invention, during the application step (d), the composition is applied by plasma spraying to the support; e.g., the composition additionally comprises an organic powder such as a polymer, or a mineral powder.

Another subject of the invention is a turbomachine comprising an abradable seal produced according to a process, wherein the abradable seal is in accordance with the invention, as described herein, and/or the process is in accordance with the invention, as described herein.

According to various embodiments of the invention, the turbomachine comprises a low-pressure compressor with at least one row of rotor blades, the seal being a seal of the low-pressure compressor which surrounds the at least one row of rotor blades.

According to various embodiments of the invention, the turbomachine comprises at least one annular row of stator blades with platforms attached to the support, the abradable coating being in contact with the platforms of blades. In various embodiments, the abradable coating forms a leak-tight barrier that protects the support starting from, axially, the platforms. Such a seal provides two-fold sealing, for example, dynamic sealing and static sealing.

According to various embodiments of the invention, the support is an inner shroud connected to the inner ends of a row of stator blades, the abradable coating being applied to the inside of the inner shroud.

According to various embodiments of the invention, the compressor comprises heating elements capable of heating the abradable material coating, and/or the compressor comprises flow bleed ports.

According to various embodiments of the invention, the inner surface of the abradable seal guides an annular flow, generally an axial annular flow, of the turbomachine.

Generally, the advantageous embodiments of each subject of the invention are also applicable to the other subjects of the invention.

The performance offered by the invention limits releases of the filler, such as polymer, into the turbomachine so as not to disrupt the combustion therein. The release of particles that obstruct the ducts and the mechanisms, or that abrade the latter, is restricted. These advantages fall within a context of improving safety.

The invention is particularly relevant within the context of a low-pressure compressor since the air which enters therein can be at −50° C., and at +170° C. at the compressor outlet. The composition proposed is suitable for low temperatures as well as for intermediate temperatures, for the temperature variations of the primary flow as a function of the flight phases of an aircraft over a range of more than 200° C. The invention additionally makes it possible to preserve the thermal resistance of the abradable material.

The Al—Ni-polyester composition offers a certain resistance to corrosion, e.g., faced with a salt spray as tests have proven. The resistance can be observed over a wide range of temperatures, for example from −50° C. to more than 150° C. This resistance also respects the sealing over time without prematurely degrading the rotor blades. These advantages space out the maintenance operations of the turbomachine which enables a substantial saving to be made.

DRAWINGS

Figure 3:
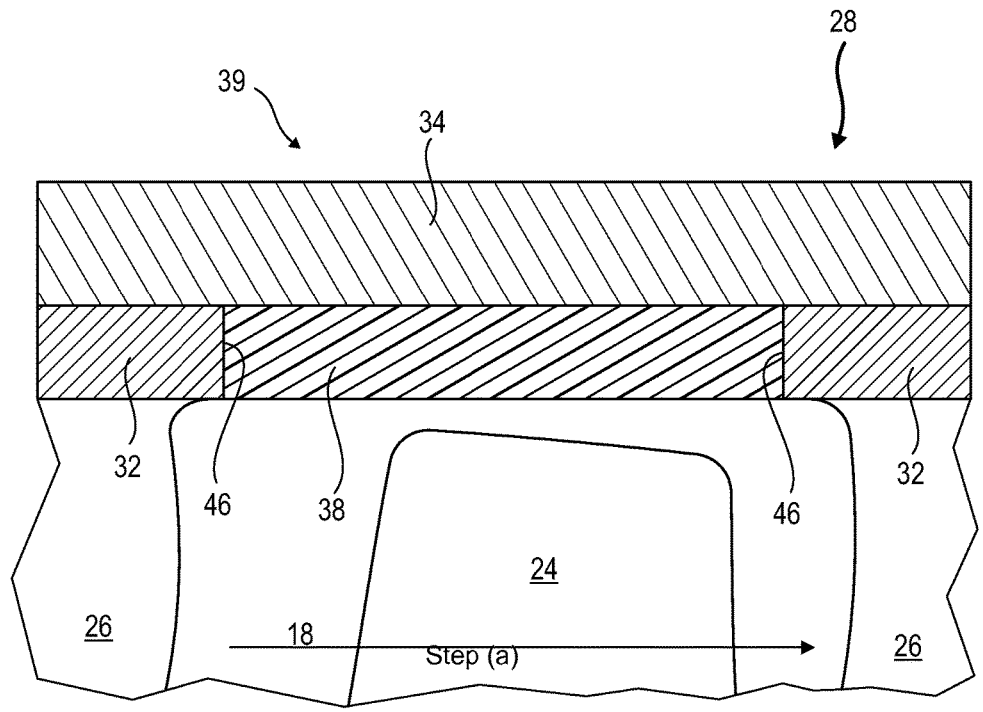

FIG. 3 outlines a turbomachine abradable seal according to various embodiment of the invention.

Figure 4:
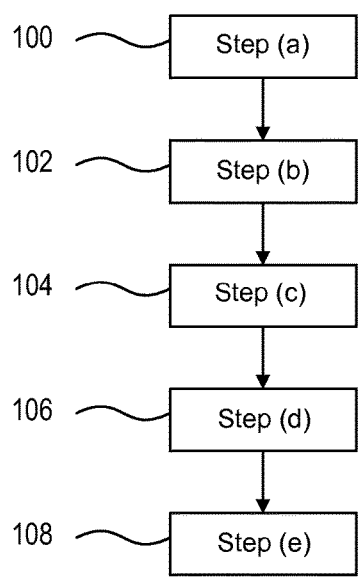

FIG. 4 illustrates a flowchart of a process for producing a turbomachine abradable seal according to various embodiment of the invention.

DETAILED DESCRIPTION

In the description which follows, the terms interior or inner and exterior or outer refer to a positioning relative to the axis of rotation of an axial-flow turbomachine. The axial direction corresponds to the direction along the axis of rotation of the turbomachine.

Figure 1:
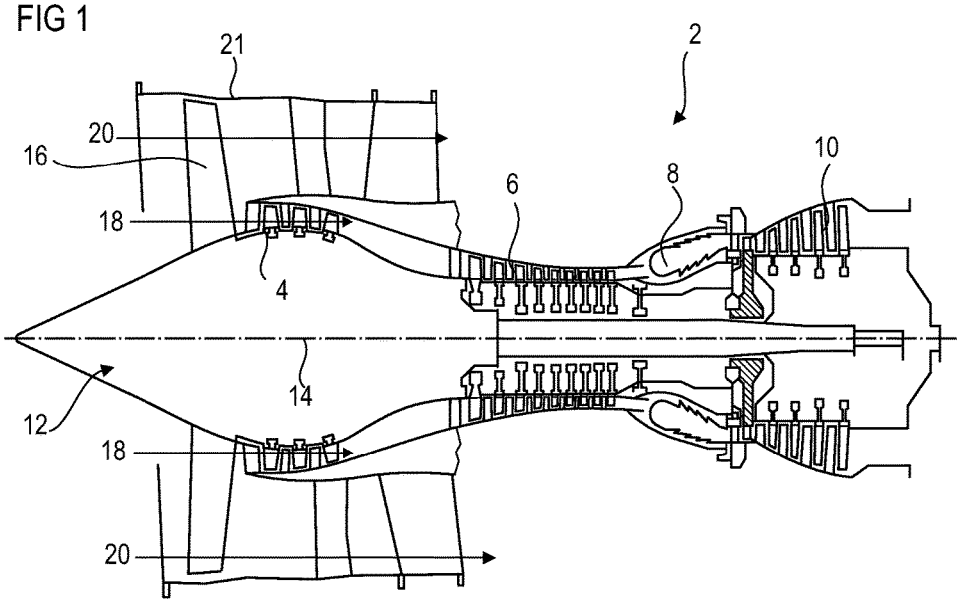
FIG. 1 represents an axial-flow turbomachine according to various embodiment of the invention.

FIG. 1 represents an axial-flow turbomachine in a simplified manner. In this specific case it is exemplarily illustrated as a turbofan. The turbofan 2 comprises a first compression stage, referred to as low-pressure compressor 4, a second compression stage, referred to as high-pressure compressor 6, a combustion chamber 8 and one or more turbine stages 10. In operation, the mechanical power of the turbine 10 transmitted by the central shaft to the rotor 12 moves the two compressors 4 and 6. The latter comprise several rows of rotor blades combined with rows of stator blades. The rotation of the rotor about its axis of rotation 14 thus makes it possible to generate an air stream and to gradually compress the latter up to the inlet of the combustion chamber 8. One or more gear reduction means can increase the speed of rotation transmitted to the compressors.

An inlet fan commonly denoted by fan or blower 16 is coupled to the rotor 12 and generates an air flow which is split into a primary flow 18 that passes through the aforementioned various stages of the turbomachine, and a secondary flow 20 that passes through an annular duct (partially represented) along the machine in order to then rejoin the primary flow at the outlet of the turbine. The secondary flow can be accelerated so as to generate a thrust reaction. The primary flow 18 and secondary flow 20 are annular flows, they are channelled by the casing of the turbomachine. For this purpose, the casing has cylindrical walls or shrouds which can be inner and outer walls or shrouds.

Figure 2:
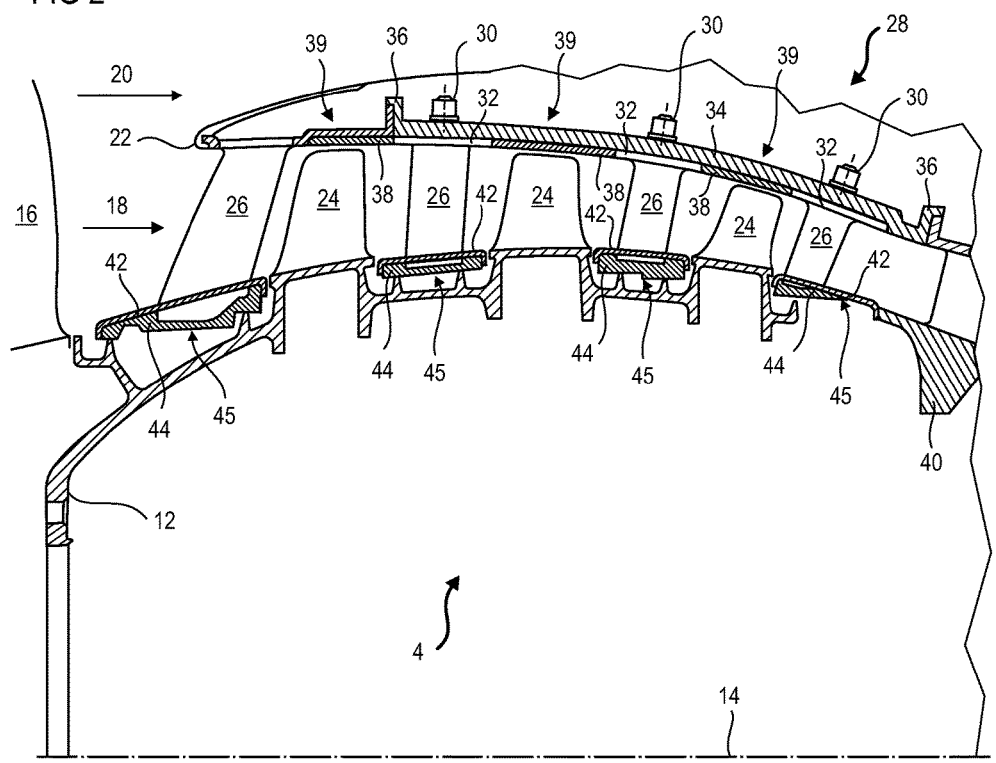
FIG. 2 is a diagram of a turbomachine compressor according to various embodiment of the invention.

FIG. 2 is a cross-sectional view of a compressor of an axial-flow turbomachine such as that from FIG. 1. The compressor can be a low-pressure compressor 4. A portion of the blower 16 and the splitter 22 for separating the primary flow 18 and the secondary flow 20 can be seen therein. The rotor 12 comprises several rows of rotor blades 24, in this particular case three.

The low-pressure compressor 4 comprises several straighteners, in this particular case four, which each contain a row of stator blades 26. The straighteners are combined with the blower 16 or with a row of rotor blades 24 in order to straighten the air flow, so as to convert the speed of the flow into static pressure. The stator blades 26 extend essentially radially from an outer casing 28 of the compressor, and can be attached thereto with the aid of a bolt 30 that radially extends the platforms 32 of stator blades 26.

The outer casing 28 can comprise an annular wall 34 and annular attachment flanges 36 that axially delimit the wall 34. The outer casing 28 can be formed of two half-shells. The wall 34 forms a sleeve and has an ogive shape, and its rotational profile is curved and mainly extends axially; its radius varies. The wall 34 serves as support for attachment to the attachment platforms 32 of the stator blades 26, and as support for the application of coatings of abradable materials 38 that ensure dynamic sealing, so as to form abradable seals 39 around the rotor blades 24. The abradable coatings 38 form uniform annular layers, such as circular strips, the thicknesses of which are greater than 2.00 mm. Dynamic sealing is understood to be a limitation of the flow between the abradable material and a rotor blade that turns during the operation of the turbomachine.

The annular attachment flanges 36 extend radially outwards. The annular flanges 36 upstream and downstream of the casing 28 make it possible to attach the compressor 4 to the intermediate blower casing 40, but also enable the attachment of the splitter 22. The attachment flanges 36 can comprise axial attachment orifices (not represented), and tubular seatings. The abradable coatings 38 can be positioned axially between the annular attachment flanges 36.

The casing 28, e.g., its wall 34, can be made from an organic matrix composite material. The composite material can comprise an epoxy resin and a preform with a stack of three-dimensionally woven carbon fibrous plies. Alternatively, the casing can be made of metal, such as a titanium or aluminium alloy. According to an alternative of the invention, the casing can be formed from several outer shrouds, added and attached axially to one another, for example using radial annular flanges.

The rows of stator blades 26 can support inner shrouds 42 connected to the inner ends of the stator blades 26. The inner surfaces of the inner shrouds 42 can support layers of abradable materials 44 so as to form seals 45 around annular strips of the rotor 12, or lips, to combat recirculations under the inner shrouds 42.

The term "coating" can be understood to mean the skin of the structure of the seal (39; 45), over which the air flows and which is subjected to aerodynamic forces. The coating can form the outer or inner surface of the seal (39; 45).

FIG. 3 represents an abradable seal 39 of a compressor such as that from FIG. 2. Represented therein is a wall 34 of a casing 28, or support 28, an abradable coating 38 which is applied thereto, and a tip of a rotor blade 24 between two stator blades 26.

The abradable coating 38 extends from one platform 32 of a blade 26 to the next, which belongs to a neighbouring row positioned upstream or downstream. The abradable coating 38 is flush with the inner surfaces of the platforms 32. The platforms 32 of stator blades 26 form circular shoulders 46 that axially delimit the abradable coatings 38. Alternatively, the wall has radial annular grooves formed in its thickness, which are filled in by the abradable coatings, over the entire depths thereof. The abradable coatings cover the entire inner surface of the wall between the platforms of the stator blades. The combination of the platforms 32 and the abradable coatings 38 forms a generally leak-tight barrier all along the casing 28, or at least the wall 34, in various embodiments, except for grooves between the platforms 32 of one and the same annular row.

The abradable coating 38 can be applied directly on its support 34. Or else, the seal 39 can comprise an interlayer between the support and the abradable coating. The interlayer can be a strip, such as a sheet of steel, or a sheet of nickel. The strip can be perforated and/or cut.

The abradable coating 38 has an inner surface in contact with the primary flow 18. Its surface guides and delimits the primary flow 18 during the compression thereof. The abradable coating 38 can comprise at least two mixed phases, namely a metallic phase and optionally a filler phase, such as a mineral phase and/or an organic filler, so as to form a composite. The materials of the abradable coating can be granular, or some can be granular and others can fill in the spaces between the grains thereof.

The metallic phase of the abradable coating 38 mainly comprises aluminium. The metallic phase of the coating is based on aluminium. That is, among the metals of the abradable material, the one having the largest weight is aluminium. The predominance of aluminium optimizes the weight of the seal 39. The metallic phase of the abradable coating 38 also comprises nickel, in a proportion by weight lower than that of the aluminium. The metallic phase can comprise between 20% and 45% nickel, and between 55% and 80% aluminium. In addition, the metallic phase can, in various instances, comprise iron, copper, zinc, manganese, magnesium, impurities, these components each representing between 1% and 0.1% of the weight of the metallic phase.

The filler of the abradable coating 38 can comprise polymer, such as polyester or methyl methacrylate. The filler can also comprise hexagonal boron nitride or calcium fluoride. The weight of the filler can represent between 5% and 50%, for example, between 15% and 25%, e.g., 20% of the weight of the coating 38. The metallic phase can represent the majority of the volume of the abradable coating. Thus, the metallic phase can form therein a matrix that receives the filler or additive. In various instances, the abradable coating can be formed of grains of metal powders, the intergranular spaces of which are filled in by the filler. The empty space in the abradable coating is less than 1%, e.g., less than 0.1%.

FIG. 4 represents a flowchart of a process for producing an abradable seal of an axial-flow turbomachine as presented in FIG. 3. The seal can be used on a compressor, e.g., a low-pressure compressor.

The process comprises the following steps, optionally carried out in the following order:
(a) provision 100 of a rounded support, such as a compressor outer casing,
(b) provision 102 of stator blades with platforms;

(c) attachment 104 of the blades by their platforms to the rounded support forming annular rows;
(d) application 106 of an abradable composition to the rounded support between the annular rows of platforms so as to cover the support between the rows of blade platforms;
(e) assembly 108 of the support around a rotor of the turbomachine, for example an annular row of rotor blades.

At the start of the step (d) of application 106, the composition has a metallic phase with mainly aluminium, for example in powder form. The metallic phase can also comprise nickel and a filler, e.g., both as powders. The composition of the powder can correspond to the chemical composition of the abradable coating presented above. At the end of the step (d) of application 106, at least one or each compound of the composition remains in powder form, or at least one of the compounds has melted, or every compound has melted.

Optionally, some grains or every type of grain are essentially solid, and their own voids represent less than 5% of their material, for example, less than 1%, e.g., less than 0.20%. Each grain can have a homogeneous material. In various embodiments, one type of grain is hollow, for example the aluminium or nickel grains.

During the step (d) of application 106, the composition can be applied to the support by plasma spraying. Such a technique is well known to a person skilled in the art, and it can be carried out in a manner similar to that disclosed in document EP 1 010 861 A2. The filler powder can be introduced into the plasma jet downstream of the metallic powders. Other techniques can be envisaged. Alternatively, the composition can be applied to the support by sintering, optionally with prolonged heating. In this alternative, certain grains can keep their initial shapes.

The steps (b) provision 102 of stator blades, (c) attachment 104 of the blades, (e) assembly 108 of the support are entirely optional according to the invention. Indeed, the abradable composition can be applied to a support free of blades and their platforms. In this case, the step (d) of application 106 can be carried out in a groove formed in the thickness of a shroud.

What is claimed is:

1. A turbomachine comprising:
a rotor;
a rounded support with an inner annular surface;
at least one coating made of abradable material covering the inner annular surface of the rounded support for cooperating by abrasion with the rotor;
wherein a composition of the abradable coating includes:
a metal phase with aluminum and nickel, the metal phase comprising, by weight, at least 50% of aluminum and between 20% and 45% of nickel; and
a filler.

2. The turbomachine in accordance with claim 1, wherein in the abradable coating, a metal phase forms a metallic matrix which is combined with the filler.

3. The turbomachine in accordance with claim 2, wherein the metallic matrix occupies a majority of a volume of the abradable coating.

4. The turbomachine in accordance with claim 1, wherein the rounded support is an outer shroud, the abradable coating being on the inside of the outer shroud.

5. The turbomachine in accordance with claim 1, wherein the rounded support is an outer casing, the abradable coating being positioned inside of the outer casing.

6. The turbomachine in accordance with claim 1, wherein the rounded support is made of an organic matrix composite material with carbon fibres, the carbon fibres being arranged as a stack, the abradable coating comprising an interface in contact with the organic matrix composite material.

7. The turbomachine in accordance with claim 1, wherein the rounded support comprises attachment portions, the attachment portions being positioned upstream and downstream of the abradable coating.

8. The turbomachine in accordance with claim 1, wherein the rounded support has an upstream edge and a downstream edge, the abradable coating covering the rounded support from the upstream edge to the downstream edge.

9. The turbomachine in accordance with claim 1, the turbomachine comprising a low-pressure compressor with at least one row of rotor blades, the abradable coating being a seal of the low-pressure compressor, which surrounds the at least one row of rotor blades.

10. The turbomachine in accordance with claim 1, the turbomachine comprising at least one annular row of stator blades with platforms attached to the rounded support, the abradable coating being in contact with the platforms of blades.

11. The turbomachine in accordance with claim 10, wherein the abradable coating forms a leak-tight barrier that protects the rounded support between the platforms.

12. A turbomachine comprising:
a rotor;
a rounded support with an inner annular surface supporting stator vanes with fixation platforms;
at least one coating made of abradable material covering the inner annular surface of the rounded support for cooperating by abrasion with the rotor;
wherein a composition of the abradable coating includes:
a metal phase with aluminum and nickel, the metal phase comprising, by weight, at least 50% of aluminum and between 20% and 45% of nickel; and
a filler.

13. The turbomachine in accordance with claim 12, wherein the metal phase comprises, by weight, between 55% and 80% of aluminum.

14. The turbomachine in accordance with claim 12, wherein the metal phase comprises, by weight, between 5% and 50% of filler.

15. The turbomachine in accordance with claim 12, wherein the filler is mineral filler.

16. The turbomachine in accordance with claim 12, wherein the filler comprises at least one material selected from a group consisting of hexagonal boron nitride, and calcium fluoride.

17. The turbomachine in accordance with claim 12, wherein the filler is a polymer selected from the group consisting of polyester, methyl methacrylate.

18. A turbomachine comprising:
a rotor;
rounded support with an inner annular surface;
at least one coating made of abradable material covering the inner annular surface of the rounded support for cooperating by abrasion with the rotor;
an interlayer comprising a metal strip between the inner annular surface and the coating,
wherein a composition of the abradable coating includes:
a metal phase with aluminum and nickel, the metal phase comprising, by weight, at least 50% of aluminum and at least 20% of nickel; and
a filler, the aluminum and the nickel being in contact of the metal strip.

19. The turbomachine in accordance with claim 18, wherein the metal strip is made of a metal sheet selected from a group consisting of steel sheet and nickel sheet.

\* \* \* \* \*